US011236241B2

(12) United States Patent
Munro et al.

(10) Patent No.: US 11,236,241 B2
(45) Date of Patent: Feb. 1, 2022

(54) COMPOSITIONS CONTAINING COATED POLYMER PARTICLES AND TPO COMPOSITIONS FORMED FROM THE SAME

(71) Applicant: Dow Global Technologies LLC, Midland, MI (US)

(72) Inventors: Jeffrey C. Munro, Bellaire, TX (US); Jihean Lee, Pearland, TX (US); Morgan M. Hughes, Angleton, TX (US)

(73) Assignee: Dow Global Technologies LLC, Midland, MI (US)

( * ) Notice: Subject to any disclaimer, the term of this patent is extended or adjusted under 35 U.S.C. 154(b) by 21 days.

(21) Appl. No.: 16/643,378

(22) PCT Filed: Sep. 7, 2018

(86) PCT No.: PCT/US2018/049913
§ 371 (c)(1),
(2) Date: Feb. 28, 2020

(87) PCT Pub. No.: WO2019/055304
PCT Pub. Date: Mar. 21, 2019

(65) Prior Publication Data
US 2021/0062018 A1 Mar. 4, 2021

Related U.S. Application Data

(60) Provisional application No. 62/559,898, filed on Sep. 18, 2017.

(51) Int. Cl.
*C08L 23/12* (2006.01)
*C09D 7/65* (2018.01)
*C09D 5/03* (2006.01)

(52) U.S. Cl.
CPC ............... *C09D 7/65* (2018.01); *C08L 23/12* (2013.01); *C09D 5/033* (2013.01); C08L 2207/53 (2013.01)

(58) Field of Classification Search
CPC ... C09D 7/65; C09D 7/66; C09D 5/00; C09D 5/033; C09D 5/03; C08L 23/12; C08L 2207/53; C08J 3/126; C08J 3/128; C08K 3/26; C08K 3/34; C08K 9/08; C08K 5/5415; B29B 9/16

USPC ....................................................... 523/201
See application file for complete search history.

(56) References Cited

U.S. PATENT DOCUMENTS

| | | | |
|---|---|---|---|
| 5,366,645 A | 11/1994 | Sobottka | |
| 6,852,787 B1 | 2/2005 | McMichael et al. | |
| 7,101,926 B2 | 9/2006 | McMichael et al. | |
| 7,122,584 B2 | 10/2006 | Moriya et al. | |
| 9,290,668 B2 | 3/2016 | Dhodapkar et al. | |
| 10,683,398 B2* | 6/2020 | Dhodapkar | C08J 3/126 |
| 2003/0181553 A1 | 9/2003 | Moriya et al. | |
| 2004/0236023 A1 | 11/2004 | Johnson et al. | |
| 2007/0034840 A1 | 2/2007 | McMichael et al. | |
| 2009/0321300 A1 | 12/2009 | Komiya et al. | |
| 2010/0124605 A1 | 5/2010 | Pan et al. | |
| 2011/0008623 A1 | 1/2011 | Dhodapkar et al. | |
| 2015/0037496 A1 | 2/2015 | Wicks et al. | |
| 2016/0039593 A1 | 2/2016 | Dhodapkar et al. | |
| 2016/0297898 A1* | 10/2016 | Karjala | C08L 23/10 |

FOREIGN PATENT DOCUMENTS

| | | |
|---|---|---|
| WO | 2001012716 | 2/2001 |
| WO | 2008013266 | 1/2008 |
| WO | 2012003542 | 1/2012 |
| WO | 2017049064 | 3/2017 |

OTHER PUBLICATIONS

PCT/US2018/049913, International Search Report and Written Opinion dated Nov. 22, 2018.
PCT/US2018/049913, International Preliminary Report on Patentability dated Mar. 24, 2020.

* cited by examiner

*Primary Examiner* — Hannah J Pak
(74) *Attorney, Agent, or Firm* — Cheney Huang

(57) ABSTRACT

A composition comprising the following: A) coated polymer particles, and wherein the polymer particles are formed from a first composition comprising an ethylene-based polymer that comprises the following properties: a density from 0.854 to 0.860 g/cc, and a melt index (I2) from 4.0 to 15.0 g/10 min; and wherein the polymer particles comprise a coating on at least a portion of the total surface of the polymer particles, and wherein the coating is formed from a powder composition comprising at least one inorganic powder, and at least one organic powder selected from a metal stearate and/or a polymer powder, and wherein the weight ratio of the total amount of the inorganic powder to the total amount of the organic powder is from 3.0 to 50.0; B) optionally, a propylene-based polymer.

11 Claims, 1 Drawing Sheet

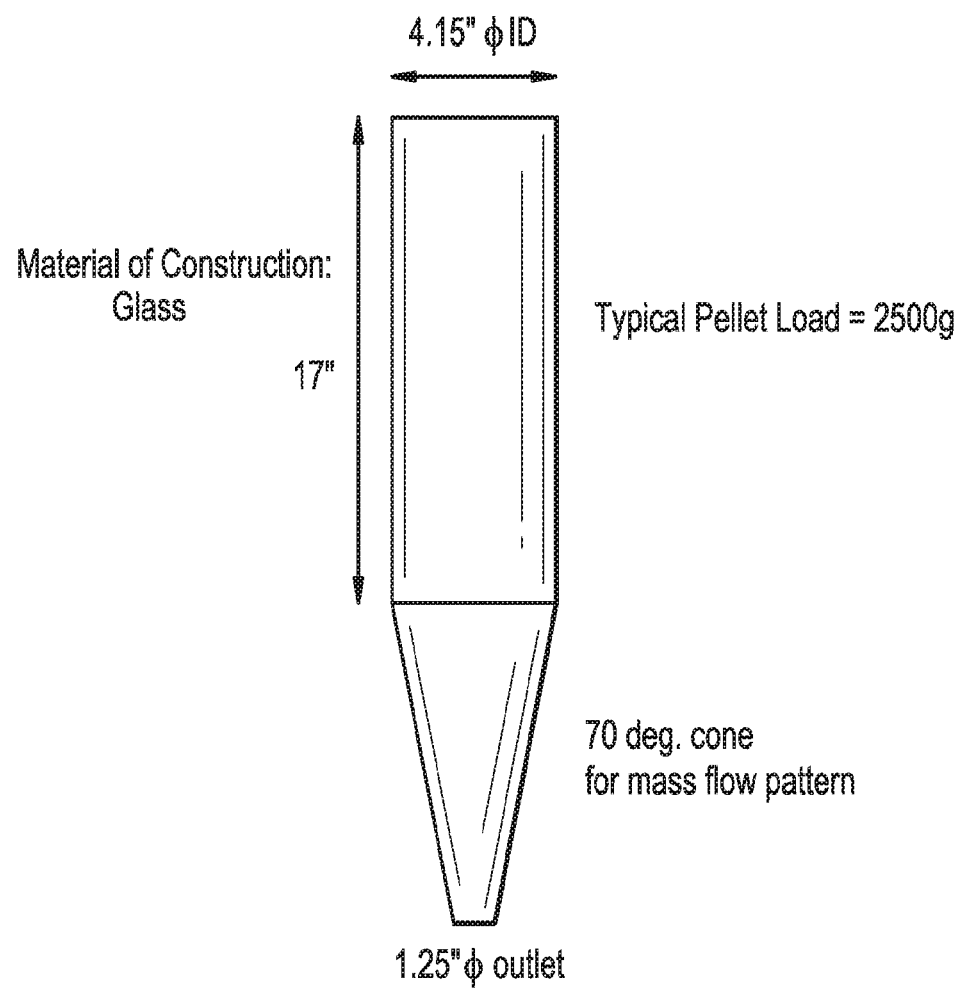

COMPOSITIONS CONTAINING COATED POLYMER PARTICLES AND TPO COMPOSITIONS FORMED FROM THE SAME

BACKGROUND

Ethylene/α-olefin elastomers have been used for several decades as impact modifiers to polypropylene, particularly for talc-filled polypropylene compounds commonly referred to as TPOs. TPO compounds are prevalent in the automotive industry, where they are used to make interior and exterior car parts, such as bumper fascia, interior door panels, airbag covers, and many other components. The majority of the parts are made by injection molding. As automotive manufacturers continue to reduce the weight of the vehicle for better fuel economy, there is a desire to reduce the thickness of TPO parts. At the same time, there is an increase in design complexity, to better improve vehicle aesthetics, and incorporation of more electronics and sensors. Both "thin-walling" and design complexity require TPO compounds with higher flow, particularly in the injection molding process. Traditionally, increasing the flow of the TPO, by, for example, increasing the melt flow rate of the polypropylene matrix, results in a loss in impact performance, which is undesirable.

There is a need for TPO formulations with improved flow, but which maintain the same level of stiffness and toughness as conventional TPO formulations. Elastomers, and formulations containing the same, are described in the following references: WO2017/049064. U.S. Pat. Nos. 6,136,937 and 5,925,703. However, there remains a need for the "improved flow" TPO formulations discussed above. This need has been met by the following composition.

SUMMARY OF THE INVENTION

A composition comprising the following:
A) coated polymer particles, and wherein the polymer particles are formed from a first composition comprising an ethylene-based polymer that comprises the following properties: a density from 0.854 to 0.860 g/cc, and a melt index (I2) from 4.0 to 15.0 g/10 min; and
wherein the polymer particles comprise a coating on at least a portion of the total surface of the polymer particles, and
wherein the coating is formed from a powder composition comprising at least one inorganic powder, and at least one organic powder selected from a metal stearate and/or a polymer powder, and wherein the weight ratio of the total amount of the inorganic powder to the total amount of the organic powder is from 3.0 to 50.0;
B) optionally, a propylene-based polymer.

BRIEF DESCRIPTION OF THE DRAWINGS

FIG. 1 depicts the steep angle glass funnel for the flowability test.

DETAILED DESCRIPTION

The inventive compositions can be used in TPO formulations that can be manufactured economically, and which have an improved overall balance of flow, stiffness, and toughness.

A composition comprising the following:
A) coated polymer particles, and wherein the polymer particles are formed from a first composition comprising an ethylene-based polymer that comprises the following properties: a density from 0.854 to 0.860 g/cc, and a melt index (I2) from 4.0 to 15.0 g/10 min; and
wherein the polymer particles comprise a coating on at least a portion of the total surface of the polymer particles, and
wherein the coating is formed from a powder composition comprising at least one inorganic powder, and at least one organic powder selected from a metal stearate and/or a polymer powder, and wherein the weight ratio of the total amount of the inorganic powder to the total amount of the organic powder is from 3.0 to 50.0;
B) optionally, a propylene-based polymer.

An inventive composition may comprise a combination of two or more embodiments described herein.

Coated polymer particles comprise polymer particles and a powder composition. The coated particles may also comprise an oil (for example, a silicone oil), which is typically applied to the surface of the polymer particles, before the powder composition is applied to the surface of the particles.

In one embodiment, the composition comprises the propylene-based polymer of component B.

In one embodiment, the propylene-based polymer of component B has a MFR from 20 to 120 g/10 min, or from 30 to 110 g/10 min, or from 40 to 100 g/10 min, from 50 to 90 g/10 min, from 60 to 80 g/10 min, from 60 to 70 g/10 min. In a further embodiment, the propylene-based polymer is a polypropylene homopolymer.

In one embodiment, the propylene-based polymer of component B has a density from 0.880 to 0.920 g/cc, or from 0.885 to 0.915 g/cc, or from 0.890 to 0.910 g/cc, or from 0.895 to 0.905 g/cc. In a further embodiment, the propylene-based polymer is a polypropylene homopolymer.

In one embodiment, the propylene-based polymer of component B has a MFR from 20 to 120 g/10 min, or from 30 to 110 g/10 min, or from 40 to 100 g/10 min, from 50 to 90 g/10 min, from 60 to 80 g/10 min, from 60 to 70 g/10 min. and a density from 0.880 to 0.920 g/cc, or from 0.885 to 0.915 g/cc, or from 0.890 to 0.910 g/cc, or from 0.895 to 0.905 g/cc. In a further embodiment, the propylene-based polymer is a polypropylene homopolymer.

In one embodiment, the composition has a MFR ≥30 g/10 min, or MFR ≥35 g/10 min. In one embodiment, the composition has a MFR ≤100 g/10 min, or MFR ≤90 g/10 min, or MFR ≤80 g/10 min, or MFR ≤70 g/10 min, or MFR ≤60 g/10 min.

In one embodiment, the composition has a MFR from 30 to 60 g/10 min, or from 30 to 55 g/10 min, or from 30 to 50 g/10 min. In one embodiment, the composition has a MFR from 35 to 60 g/10 min, or from 35 to 55 g/10 min, or from 35 to 50 g/10 min.

In one embodiment, the composition comprises ≥50 wt % component B, and ≤50 wt % component A, and wherein each wt % based on the weight of the composition. In one embodiment, the composition comprises ≥55 wt % component B, and ≤45 wt % component A, and wherein each wt % based on the weight of the composition. In one embodiment, the composition comprises ≥58 wt % component B, and ≤40 wt % component A, and wherein each wt % based on the weight of the composition. In one embodiment, the composition comprises ≥60 wt % component B, and ≤35 wt % component A, and wherein each wt % based on the weight of the composition.

In one embodiment, the composition has a "Dart at −10° C., % Ductility" from 50 to 100, or from 60 to 100, or from 70 to 100, of from 80 to 100, or from 90 to 100, or from 95 to 100.

In one embodiment, the composition has a "Dart at −20° C., % Ductility" from 50 to 100, or from 60 to 100, or from 70 to 100, of from 80 to 100, or from 90 to 100, or from 95 to 100.

In one embodiment, the composition has a "Dart at −30° C., % Ductility" from 30 to 90, or from 40 to 90, or from 50 to 90, of from 60 to 90, or from 70 to 90, or from 80 to 90.

In one embodiment, the composition has an "Izod strength at 23° C., $kJ/m^2$" from 20 to 50, or from 25 to 45.

In one embodiment, the composition has an "Izod strength at 0° C., $kJ/m^2$" from 9 to 40, or from 9 to 35.

In one embodiment, the composition has a "Flexural Modulus, kpsi" from 160,000 to 240,000 kpsi, or from 170,000 to 220,000 kpsi.

In one embodiment, for component A, the first composition comprises ≥95 wt %, or ≥96 wt %, or ≥97 wt %, or ≥98 wt %, or ≥99 wt % of the ethylene-based polymer, based on the weight of the first composition.

In one embodiment, for component A, the ethylene-based polymer is an ethylene/alpha-olefin interpolymer, and further an ethylene/alpha-olefin copolymer.

In one embodiment, for component A, the organic powder is a metal stearate, and further a calcium stearate or a zinc stearate, and further a calcium stearate.

In one embodiment, for component A, the inorganic powder is selected from the group consisting of the following: talc, mica, calcium carbonate, finely divided silica, fumed silica, quartz, and combinations thereof. In one embodiment, for component A, the inorganic powder is selected from the group consisting of the following: talc, mica, finely divided silica, fumed silica, and combinations thereof. In one embodiment, for component A, the inorganic powder is talc.

In one embodiment, for component A, the coated polymer particles further comprise a binder. In a further embodiment, the binder is a silicone oil (silicone fluid).

In one embodiment, the coated polymer particles have a flowability, after 12 weeks at 37° C., ≥200 g/s, or ≥210 g/s.

In one embodiment, the coated polymer particles have an Unconfined Yield Strength (37° C., 6 weeks), ≤400 $lb/ft^2$, or ≤380 $lb/ft^2$, or ≤360 $lb/ft^2$.

Also provided is an article comprising at least one component formed from the composition of any one of the previous claims. In one embodiment, the article is an injection molded article. In one embodiment, the article is an automotive part.

An inventive composition may comprise a combination of two or more embodiments described herein.

Component A may comprise a combination of two or more embodiments described herein. Component B may comprise a combination of two or more embodiments described herein.

Composition

In one embodiment, the composition comprises one or more additives. Additives include, but are not limited to, antioxidants, ultraviolet absorbers, antistatic agents, colorants (e.g., titanium dioxide, carbon black and pigments), viscosity modifiers, anti-block agents, release agents, coefficient of friction (COF) modifiers, thermal stabilizers, odor modifiers/absorbents, and any combination thereof.

In one embodiment, the composition comprises a filler. In a further embodiment, the filler is a mineral filler (for example, talc). In one embodiment, the composition comprises from 1 to 40 wt %, or from 2 to 35 wt %, or from 3 to 30 wt %, or from 4 to 25 wt %, or from 5 to 20 wt % of the filler (for example talc), based on the weight of the composition.

In one embodiment, the composition comprises a filler. In a further embodiment, the filler is a mineral filler (for example, talc). In one embodiment, the composition comprises from 4 to 40 wt %, or from 5 to 35 wt %, or from 6 to 30 wt %, or from 7 to 25 wt %, or from 8 to 20 wt %, or from 8 to 15 wt %, or from 8 to 12 wt % of the filler (for example talc), based on the weight of the composition.

In one embodiment, the polymer composition comprises at least one other thermoplastic polymer. In a further embodiment, the at least one other thermoplastic polymer is selected from the group consisting of polystyrene homopolymer, or a polyethylene homopolymer (for example, A HDPE).

In one embodiment, the propylene-based polymer of component B is selected from a polypropylene homopolymer, a propylene/alpha-olefin copolymer, a propylene/ethylene copolymer, or an impact modified propylene-based polymer. In one embodiment, the propylene-based polymer of component B is selected from a polypropylene homopolymer, a propylene/alpha-olefin copolymer, or a propylene/ethylene copolymer. In one embodiment, the propylene-based polymer of component B is selected from a polypropylene homopolymer or a propylene/ethylene copolymer. In one embodiment, the propylene-based polymer of component B is a polypropylene homopolymer.

In one embodiment, the propylene-based polymer of component B has a MFR from 1 to 150 g/10 min, or from 5 to 130 g/10 min or from 10 to 120 g/10 min, or from 20 to 100 g/10 min, or from 30 to 80 g/10 min, or from 40 to 70 g/10 min, or from 50 to 60 g/10 min (230° C., 2.16 kg). In a further embodiment, the propylene-based polymer is a polypropylene homopolymer.

Coated Polymers Particles

In one embodiment, the polymer particles are pellets, beads, flakes, or powders. The D50 value of the polymer particles is greater that the D50 value of the powder composition, and preferably the D50 value of the polymer particles is ≥2×, further ≥5×, further ≥10×, the D50 value of the powder composition, as described herein. Typical polymer particles are generally substantially platelet, spherical, cylindrical, or rod shape. While the cross-sectional area may vary, depending upon the polymer, preferably, the cross-sectional area of a polymer particle is from $3 \times 10^{-3}$ square inch ($1.93 \times 10^{-2}$ square centimeters) to 0.2 square inch (1.29 square centimeters); that is from 1/16 inch (0.15875 cm) to 1/2 inch (1.27 cm) in diameter, if the cross-section is, for example, circular. In one embodiment, the particles have a cross-sectional area from 0.01 square inch ($6.45 \times 10^{-2}$ square centimeters) to 0.05 square inch (0.322 square centimeters); that is from 0.125 inch (0.3175 cm) to 0.375 inch (0.9525 cm) in diameter, if, for example, the cross-section is circular. In one embodiment, are particles are from 0.25 cm to 0.40 cm in diameter.

As discussed above, the polymer particles are in the form of particulate solids, ranging in size from powders to pellets. Pellets are particulate solids, and are generally, but not exclusively, formed through extrusion and pelletization processes, with a typical average particle size (average of the longest dimension) greater than 2 mm, typically from 2 mm to 10 mm, further from 2 mm to 6 mm, and further from 2 mm to 4 mm. Micropellets typically have an average particle size less than that of a standard pellet, yet greater than those average particle sizes produced from general commercial die capabilities. The average particle size of micropellets typically range from 200 microns to 2 mm. The micropellets generally exhibit a semi-spheroidal shape.

First Composition

In one embodiment, the polymer particles are formed from a first composition comprising an ethylene-based polymer, and further an ethylene-based interpolymer, and further an ethylene-based copolymer. Suitable ethylene-based interpolymers or copolymers, include, but are not limited to, ethylene/alpha-olefin interpolymers or copolymers, for example, ethylene/$C_3$-$C_8$ alpha-olefin interpolymers or copolymers. Preferable alpha-olefins are those having from 3 to 8 carbon atoms, such as propylene, 1-butene, 1-pentene, 1-hexene, 1-heptene, and 1-octene.

In one embodiment, the ethylene-based polymer is an ethylene/α-olefin/diene terpolymer, for example ethylene/propylene/diene terpolymer.

In one embodiment, the ethylene-based polymer has a density from 0.854 to 0.860 g/cc, or 0.855 to 0.860 g/cc, or 0.856 to 0.860 g/cc, or 0.857 to 0.860 g/cc, or from 0.858 to 0.860 g/cc (1 cc=1 cm$^3$). In a further embodiment, the ethylene-based polymer is an ethylene-based interpolymer, and further an ethylene/α-olefin interpolymer, and or an ethylene/α-olefin copolymer. Preferable alpha-olefins are those having from 3 to 8 carbon atoms, such as propylene, 1-butene, 1-pentene, 1-hexene, 1-heptene, and 1-octene.

In one embodiment, the ethylene-based polymer has a melt index (I2, 190° C. and 2.16 kg) from 4.0 to 14.5 g/10 min, or from 4.0 to 14.0 g/10 min or from 4.5 to 13.5 g/10 min. In a further embodiment, the ethylene-based polymer is an ethylene-based interpolymer, and further an ethylene/α-olefin copolymer. Preferable alpha-olefins are those having from 3 to 8 carbon atoms, such as propylene, 1-butene, 1-pentene, 1-hexene, 1-heptene, and 1-octene.

In one embodiment, the ethylene-based polymer has I10/I2 ratio from 6.8 to 7.7, or from 7.0 to 7.5. In a further embodiment, the ethylene-based polymer is an ethylene-based interpolymer, and further an ethylene/α-olefin copolymer. Preferable alpha-olefins are those having from 3 to 8 carbon atoms, such as propylene, 1-butene, 1-pentene, 1-hexene, 1-heptene, and 1-octene.

In one embodiment, the ethylene-based polymer has a number average molecular weight (Mn) from 30,000 to 44,000 g/mole, or from 32,000 to 42,000 g/mole. In a further embodiment, the ethylene-based polymer is an ethylene-based interpolymer, and further an ethylene/α-olefin copolymer. Preferable alpha-olefins are those having from 3 to 8 carbon atoms, such as propylene, 1-butene, 1-pentene, 1-hexene, 1-heptene, and 1-octene.

In one embodiment, the ethylene-based polymer has a molecular weight distribution (MWD), from 1.7 to 3.5, or from 1.8 to 3.2, or from 1.8 to 3.0, or from 1.8 to 2.8. In a further embodiment, the ethylene-based polymer is an ethylene-based interpolymer, and further an ethylene/α-olefin copolymer. Preferable alpha-olefins are those having from 3 to 8 carbon atoms, such as propylene, 1-butene, 1-pentene, 1-hexene, 1-heptene, and 1-octene.

In one embodiment, the ethylene-based polymer has a melting temperature (Tm) from 35 to 55° C., or from 40 to 50° C., or from 42 to 48° C. In a further embodiment, the ethylene-based polymer is an ethylene-based interpolymer, and further an ethylene/α-olefin copolymer. Preferable alpha-olefins are those having from 3 to 8 carbon atoms, such as propylene, 1-butene, 1-pentene, 1-hexene, 1-heptene, and 1-octene.

In one embodiment, the ethylene-based polymer has a crystallization temperature (Tc) from 15 to 35° C., or from 20 to 30° C., or from 22 to 28° C. In a further embodiment, the ethylene-based polymer is an ethylene-based interpolymer, and further an ethylene/α-olefin copolymer. Preferable alpha-olefins are those having from 3 to 8 carbon atoms, such as propylene, 1-butene, 1-pentene, 1-hexene, 1-heptene, and 1-octene.

In one embodiment, the ethylene-based polymer has a melting temperature (Tg) from −65 to −55° C., or from −64 to −60° C. In a further embodiment, the ethylene-based polymer is an ethylene-based interpolymer, and further an ethylene/α-olefin copolymer. Preferable alpha-olefins are those having from 3 to 8 carbon atoms, such as propylene, 1-butene, 1-pentene, 1-hexene, 1-heptene, and 1-octene.

In one embodiment, the ethylene-based polymer has a melt viscosity V0.1 (190° C.) from 500 to 2500 Pa·s, or from 600 to 2000 Pa·s. In a further embodiment, the ethylene-based polymer is an ethylene-based interpolymer, and further an ethylene/α-olefin copolymer. Preferable alpha-olefins are those having from 3 to 8 carbon atoms, such as propylene, 1-butene, 1-pentene, 1-hexene, 1-heptene, and 1-octene.

In one embodiment, the ethylene-based polymer has a melt viscosity ratio V0.1/V100 (each viscosity at 190° C.) from 1.5 to 3.0, or from 1.5 to 2.8. In a further embodiment, the ethylene-based polymer is an ethylene-based interpolymer, and further an ethylene/α-olefin copolymer. Preferable alpha-olefins are those having from 3 to 8 carbon atoms, such as propylene, 1-butene, 1-pentene, 1-hexene, 1-heptene, and 1-octene.

An ethylene-based polymer may comprise a combination of two or more embodiments described herein. An ethylene-based interpolymer may comprise a combination of two or more embodiments described herein. An ethylene-based copolymer may comprise a combination of two or more embodiments described herein.

In one embodiment, the first composition comprises ≥90 wt %, or ≥91 wt %, or ≥92 wt %, or ≥93 wt %, or ≥94 wt %, or ≥95 wt %, or ≥96 wt %, or ≥97 wt %, or ≥98 wt %, or ≥99 wt % of the ethylene-based polymer, based on the weight of the first composition. In a further embodiment, the ethylene-based polymer is an ethylene/α-olefin interpolymer, and further an ethylene/α-olefin copolymer. In a further embodiment, the α-olefin is selected from the group consisting of propylene, 1-butene, 1-pentene, 1-hexene, 1-heptene, and 1-octene.

Powder Composition

Inorganic powders include, but are not limited to, talc, mica, calcium carbonate, quartz, finely divided or fumed silica, alumina trihydrate, marble dust, cement dust, clay, feldspar, alumina, magnesium oxide, magnesium hydroxide, antimony oxide, zinc oxide, barium sulfate, aluminum silicate, calcium silicate, titanium dioxide, titanates, and chalk.

In one embodiment, the inorganic powder is selected from the group consisting of the following: talc, mica, calcium carbonate, finely divided silica, fumed silica, quartz, and combinations thereof. In one embodiment, the inorganic powder is selected from the group consisting of the following: talc, mica, calcium carbonate, and combinations thereof; or talc, mica, or combinations thereof. In one embodiment, the inorganic powder is talc.

In one embodiment, the inorganic powder has D50 value ≤100 microns, or ≤50 microns, or ≤20 microns. In one embodiment, the inorganic powder has D50 value ≥0.5 microns, or ≥1 microns, or ≥2 microns. In a further embodiment, D50 value of the polymer particles is ≥2×, further ≥5×, further ≥10×, the D50 value of the powder composition.

Organic powders, useful for the present invention, include metal stearates, polymer powders and combinations thereof. Examples of polymer powders include powdered ethylene-based polymers (for example powder polyethylene homopolymers), powdered polystyrene and powdered propylene-based polymers (for example, powdered polypropylene homopolymers). In one embodiment, the organic powder is a metal stearate, and further calcium stearate or zinc stearate, and further calcium stearate.

In one embodiment, the organic powder has D50 value ≤100 microns, or ≤50 microns, or ≤20 microns. In one embodiment, the inorganic powder has D50 value ≥0.5 microns, or ≥1 microns, or ≥2 microns. In a further embodiment, D50 value of the polymer particles is ≥2×, further ≥5×, further ≥10×, the D50 value of the powder composition.

In one embodiment, the powder composition has D50 value ≤100 microns, or ≤50 microns, or ≤20 microns. In one embodiment, the inorganic powder has D50 value ≥0.5 microns, or ≥1 microns, or ≥2 microns. In a further embodiment, D50 value of the polymer particles is ≥2×, further ≥5×, further ≥10×, the D50 value of the powder composition.

Generally, the amount of powdered composition is ≤5.0 weight percent, or ≤4.0 weight percent, or ≤3.0 weight percent, based on the total weight of the coated polymer particles. In one embodiment, the amount of powder composition is ≥0.05 weight percent, or ≥0.10 weight percent, or ≥0.20 weight percent, based on the total weight of the coated polymer particles. In one embodiment, the amount of powder composition is ≥0.25 weight percent, or ≥0.30 weight percent, or ≥0.35 weight percent, or ≥0.40 weight percent, or ≥0.45 weight percent, based on the total weight of the coated polymer particles.

In one embodiment, the coated polymer particles comprises from 0.10 to 3.00 weight percent, or from 0.20 to 2.50 weight percent, or from 0.30 to 2.00 weight percent, or from 0.30 to 1.50 weight percent, or from 0.40 to 1.00 weight percent of the powder composition, based on the weight of the coated polymer particles.

In one embodiment, the weight ratio of the total amount of inorganic powder to the total amount organic powder is from 3.0 to 45.0, or from 3.0 to 40.0, or from 3.0 to 35.0, or from 3.0 to 25.0, or from 3.0 to 20.0. In one embodiment, the weight ratio of the total amount of inorganic powder to the total amount organic powder is from 3.0 to 15.0, or from 3.0 to 12.0, or from 3.0 to 9.0, or from 3.0 to 7.0, or from 3.0 to 5.0.

In one embodiment, the powder composition coats on at least 50%, or at least 60%, or at least 70%, or at least 80%, or at least 90%, or at least 95% of the total surface of the polymer particle.

The total surface area of the polymer particles can be calculated from the average pellet dimensions of the particles (for example, pellets) and the weight of the particles per gram; or by a BET analysis (for example, using a BET instrument available from Micromeritics ASAP 2420). The amount of surface area of the polymer particles that has been coated with a powder composition can be determined by visual inspection, typically with the use of a magnifying glass.

In one embodiment, the coated polymer particles comprise from 0.02 to 3.00 weight percent, or from 0.04 to 2.50 weight percent, or from 0.06 to 2.00 weight percent, or from 0.08 to 1.50 weight percent of the powder composition, based on the weight of the coated polymer particles. In one embodiment, the coated polymer particles comprise from 0.10 to 1.60 weight percent, or from 0.20 to 1.40 weight percent, or from 0.30 to 1.20 weight percent, or from 0.40 to 1.00 weight percent, or from 0.60 to 0.80 weight percent of the powder composition, based on the weight of the coated polymer particles.

In one embodiment, the total amount of organic powder plus the total amount of inorganic powder comprise ≥90 wt %, or ≥91 wt %, or ≥92 wt %, or ≥93 wt %, or ≥94 wt %, or ≥95 wt %, or ≥96 wt %, or ≥97 wt %, or ≥98 wt %, or ≥99 wt % of the total weight of the powder composition.

Binder

Binders are those agents that hold or fix the powdered composition to the polymer particles, such that, at normal handling and shipping conditions, a majority amount of the powdered composition remains on the polymer particles.

In one embodiment, the composition further comprises a binder. In one embodiment, at least a portion of the binder coats at least a portion of the total surface of the polymer particles, to form a binder coating, and such that the binder coating is located between the polymer particles and the coating formed from the powder composition.

The type of binder, and its amount, will vary, depending upon the powder composition, polymer, and other components of the composition. The preferred binders are those, in which the viscosity is not so high, such that the binder is difficult to apply. On the other hand, the viscosity should not be so low, that excessive dust from the powder composition results. Generally, oils with a viscosity in the range from 50 to 60,000 centistokes, or from 100 to 10,000 centistokes, at 25° C. are useful.

In one embodiment, the binder is selected from the group consisting of the following: silicone oils (or silicone fluids); polyether polyols; aliphatic hydrocarbon oils, such as mineral oil; and alkanes or alkenes having from seven to 18 carbon atoms, and wherein one or more carbons are optionally substituted with OH, $CO_2H$, or esters. Binders also include natural oils, such as castor, corn, cottonseed, olive, rapeseed, soybean, sunflower, other vegetable and animal oils, as well as, naphthenic, paraffinic, aromatic, and silicone oils (or silicone fluids), and esters, alcohols, and acids of said oils or their emulsions. Substances, which are often employed as plasticizers or tackifiers, may also be useful as a binder.

In one embodiment, the binder is a siloxane polymer having the structural formula —Si($R^1R^1$)—O— wherein the $R^1$ groups are $C_1$-$C_{18}$ hydrocarbyl groups. Particularly preferable hydrocarbyl groups include aliphatic and aromatic groups. A particularly preferable group for $R^1$ is a methyl group. These materials are commercially available from Dow Corning.

In one embodiment, the binder is selected from the group consisting of the following: polyether polyols; aliphatic hydrocarbon oils; alkanes having from 7 to 18 carbon atoms, and optionally substituted with OH, $CO_2H$, or esters; alkenes having from 7 to 18 carbon atoms, and optionally substituted with OH, $CO_2H$, or esters; natural oils; naphthenic oils; paraffinic oils; aromatic oils; silicone oils (or silicone fluids); and combinations thereof. In one embodiment, the binder is a silicone oil (or silicone fluid).

In one embodiment, the composition comprises from 0.010 to 0.050 weight percent, or from 0.015 to 0.04 weight percent, or from 0.020 to 0.035 weight percent of the binder, based on the total weight of the coated polymer particles.

In one embodiment, the binder has a viscosity, at 25° C., from 200 to 2000 cSt, or from 250 to 1800 cSt, or from 300 to 1500 cSt, or from 300 to 1000 cSt, or from 300 to 500 cSt.

The binder may be employed in purified form, in solutions, emulsions or in mixtures. Mixing of the powder composition and the polymer particles should be kept to a minimum, especially when using non-thermoplastic binders. Too much mixing may result in surface segregation, resulting in non-homogeneous layers.

Coating Processes

Examples of blending equipment/processes include any mechanical means of moving the polymer particles, such as, for example, a simple tumbling of a jar, or blending in a conical rotating vessel, ribbon blender, drum tumbler, paddle blender, agglomeration pan and fluidized bed operations. In one embodiment, the coating process includes the use of a pneumatic conveyor, under air or inert gas. Moderate stirring, shaking, or even a short distance of conveying in a screw conveyor, can be sufficient for such adequate distribution of the agent or agents. The type of contacting employed, may be the same, or different, for the binder and the powder composition, if the polymer particles are contacted with the binding agent and powder composition at separate times.

The contacting of the agents (binder and/or powder composition) and the polymer particles can be conducted at any temperature, at which an agent does not evaporate, solidify, become too viscous, or significantly react with the polymer particles. Such temperatures often vary, depending upon the components of the coated polymer particles, but typically are from −10° C. to 150° C., further from 0° C. to 60° C., or from 5° C. to 35° C.

In some situations, it may not be desirable to employ a binder. Such situations include, for example, when the binder will interfere with the end-use application of the polymer particles. Also, in some situations, it may be desirable to minimize the amount of powder composition. In this manner, the unassociated environmental dust (from the powder composition) can be minimized. It also advantageous to reduce the amount of powder composition, if, for example, films are being made from the final composition, and optical properties are important.

The compositions that do not require a binder, employ the same types of polymer particles and powder compositions as discussed above. In one embodiment, the amount of powder composition can be ≤3.0, or ≤2.0, or ≤1.5, or ≤1.0, or ≤0.5, or ≤0.3 weight percent, based on the weight of the coated polymer particles. Correspondingly, the effective amount of powder composition is typically ≥0.08, or ≥0.10, or ≥0.15 weight percent, based on the weight of the coated polymer particles.

In one embodiment, the powder composition is mechanically adhered to the polymer particles. In one embodiment, the process comprises mechanically adhering an effective amount of powder composition to more than about 40 percent, further more than about 50 percent, further more than about 60 percent of the total surface of the polymer particles. In this manner, polymer particles, which have an effective amount of adhered powder composition, will serve as a barrier to prevent large numbers of polymer particles that do not have an effective amount of adhered powder composition, from agglomerating or blocking. The depth to which the particle is embedded, and the amount of powder composition, will determine the thickness of the powder composition layer on the polymer particles. This thickness will, of course, also vary, depending upon the type of polymer, the size of the particles, the type of powder composition, and the desired amount of powder composition, as determined by unconfined yield strength. These coating features can be measured, for example, by scanning electron microscopy (SEM).

The powder composition can be mechanically adhered to the polymer particles in any way. This may be accomplished simultaneously with, or subsequent to, the particle formation. One way, in which this can be accomplished, is, for example, by impact coating the polymer particles, such that the desired amount of powder composition is adhered to the desired amount of polymer particles. This can be facilitated by the use of steam.

Another way to mechanically adhere powder composition is to soften the polymer particles, either before, simultaneously with, or after, contacting the polymer particles with the powder composition. The softening may be done in any manner, so long as the surface is softened sufficiently to adhere an effective amount of the powder composition, to the exterior surface of the polymer particles. However, the polymer particles must not be softened, so much, that there are no longer discrete particles, that is, the polymer particles should not become melted or adhered together. In general, one can usually observe (for example, visual observation) the surface of the polymer particles becoming slightly tacky, and ready for coating. The point at which this occurs, will vary by polymer and the type of powder composition employed. The choice of softening method will vary, depending upon the type of polymer, type of powder composition, and the desired results. Generally, heating by hot air, radiation (UV, IR, visible), contact heating, or a combination thereof, may be employed. In general, one can usually observe when the particles have been heated sufficiently, because the surface of the polymer particles will become slightly tacky, and ready for coating. As discussed, the point, at which this occurs, will vary by the type of polymer, the size of the particles, and the type of powder composition employed.

Articles

The invention also provides an article comprising at least one component formed from an inventive composition. Articles include, but are not limited to, injection molded articles, thermoformed articles and foams. Additional articles include medical devices (e.g., pressure cuffs and stabilization devices); inflatable articles (e.g., toys, watercraft, cushioning and furniture), sheets (e.g., awnings, banners, signs, tents, tarpaulins, and liners for pools, ponds or landfills), book bindings, carriers (e.g., sporting bags and backpacks), and automotive parts. Preferred articles include automotive parts.

Definitions

Unless stated to the contrary, implicit from the context, or customary in the art, all parts and percents are based on weight, and all test methods are current as of the filing date of this disclosure.

The term "composition," as used herein, includes a mixture of materials, which comprise the composition, as well as reaction products and decomposition products formed from the materials of the composition. Any reaction product or decomposition product is typically present in trace or residual amounts.

The term "polymer," as used herein, refers to a polymeric compound prepared by polymerizing monomers, whether of the same or a different type. The generic term polymer thus embraces the term homopolymer (employed to refer to polymers prepared from only one type of monomer, with the understanding that trace amounts of impurities can be incorporated into the polymer structure) and the term interpolymer as defined hereinafter. Trace amounts of impurities, such as catalyst residues, may be incorporated into and/or within a polymer.

The term "interpolymer," as used herein, refers to polymers prepared by the polymerization of at least two different types of monomers. The term interpolymer thus includes the term copolymer (employed to refer to polymers prepared from two different types of monomers) and polymers prepared from more than two different types of monomers.

The term, "olefin-based polymer," as used herein, refers to a polymer that comprises, in polymerized form, 50 wt % or a majority amount of olefin monomer, for example ethylene or propylene, (based on the weight of the polymer), and optionally may comprise one or more comonomers.

The term, "olefin-based interpolymer," as used herein, refers to an interpolymer that comprises, in polymerized form, 50 wt % or a majority amount of olefin monomer, for example ethylene or propylene, (based on the weight of the interpolymer), and one or more comonomers.

The term, "olefin-based copolymer," as used herein, refers to an copolymer that comprises, in polymerized form, 50 wt % or a majority amount of olefin monomer, for example ethylene or propylene, (based on the weight of the copolymer), and one comonomer, as the only two monomer types.

The term, "ethylene-based polymer," as used herein, refers to a polymer that comprises, in polymerized form, 50 wt % or a majority amount of ethylene monomer (based on the weight of the polymer), and optionally may comprise one or more comonomers.

The term, "ethylene-based interpolymer," as used herein, refers to an interpolymer that comprises, in polymerized form, 50 wt % or a majority amount of ethylene monomer (based on the weight of the interpolymer), and one or more comonomers.

The term, "ethylene-based copolymer," as used herein, refers to an copolymer that comprises, in polymerized form, 50 wt % or a majority amount of ethylene monomer (based on the weight of the copolymer), and one comonomer, as the only two monomer types.

The term "ethylene/α-olefin interpolymer," as used herein, refers to an interpolymer that comprises, in polymerized form, 50 wt % or a majority amount of ethylene monomer (based on the weight of the interpolymer), and at least one α-olefin.

The term, "ethylene/α-olefin copolymer," as used herein, refers to a copolymer that comprises, in polymerized form, 50 wt % or a majority amount of ethylene monomer (based on the weight of the copolymer), and an α-olefin, as the only two monomer types.

The term "ethylene/α-olefin/diene interpolymer," as used herein, refers to an interpolymer that comprises, in polymerized form, ethylene monomer, an α-olefin, and a diene. Typically, the "ethylene/α-olefin/diene interpolymer," comprises, in polymerized form, a majority amount of ethylene monomer, based on the weight of the interpolymer.

The term, "propylene-based polymer," as used herein, refers to a polymer that comprises, in polymerized form, a majority amount of propylene monomer (based on the weight of the polymer), and optionally may comprise one or more comonomers.

The term, "propylene-based interpolymer," as used herein, refers to an interpolymer that comprises, in polymerized form, a majority amount of propylene monomer (based on the weight of the interpolymer), and one or more comonomers.

The term, "propylene-based copolymer," as used herein, refers to a copolymer that comprises, in polymerized form, a majority amount of propylene monomer (based on the weight of the copolymer), and one comonomer, as the only two monomer types.

The term "propylene/α-olefin interpolymer," as used herein, refers to an interpolymer that comprises, in polymerized form, a majority amount of propylene monomer (based on the weight of the interpolymer), and at least one α-olefin.

The term, "propylene/α-olefin copolymer," as used herein, refers to a copolymer that comprises, in polymerized form, a majority amount of propylene monomer (based on the weight of the copolymer), and an α-olefin, as the only two monomer types.

The term "propylene/ethylene interpolymer," as used herein, refers to an interpolymer that comprises, in polymerized form, a majority amount of propylene monomer (based on the weight of the interpolymer), and at least ethylene.

The term, "propylene/ethylene copolymer," as used herein, refers to a copolymer that comprises, in polymerized form, a majority amount of propylene monomer (based on the weight of the copolymer), and ethylene, as the only two monomer types.

The phrase "coating on at least a portion of the total surface of the polymer particles," as used herein, refers to a surface coating on ≥10% of the total surface area of the particles. The total surface area of the particles can be calculated from the average pellet dimensions of the particles (for example, pellets) and the weight of the particles per gram; or by a BET analysis (for example, using a BET instrument available from Micromeritics ASAP 2420). The amount of surface area of the polymer particles that has been coated with a powder composition can be determined by visual inspection, typically with the use of a magnifying glass. In one embodiment, the powder composition coats ≥20%, or ≥30%, or ≥40%, or ≥50%, or ≥60%, or ≥70%, or ≥80%, or ≥90%, or ≥95% of the total surface area of the particles.

The term, "inorganic powder," as used herein, refers to a chemical compound that does not contain the element carbon, with the exception of oxides of carbon, for example, calcium carbonate, and sulfides of carbon, for example, carbon disulfide.

The term, "organic powder," as used herein, refers to a chemical compound that contains the element carbon, with the exception of oxides of carbon, for example, calcium carbonate, and sulfides of carbon, for example, carbon disulfide.

The term "polymer powder," as used herein, in reference to a powder composition, refers to fine polymer particles that have a D50 value less than the D50 value of the polymer particles. Typically, the polymer powder has a D50 value ≤200 microns, and further a D50 value ≤150 microns, further a D50 value ≤100 microns.

As used herein "mechanically adhered," as used herein, refers to the physically bound particles of the powder composition onto the polymer particles; for example the particles of the powder composition are embedded into the surfaces of the polymer particles.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

Test Methods

Density is measured according to ASTM D792 (ASTM D4703, A1 Proc C, test within 1 hour).

Melt index ($I_2$) of an ethylene-based polymer is measured at 190° C. under a load of 2.16 kg, according to ASTM D-1238. Melt index ($I_5$) is measured at 190° C. under a load of 5 kg, according to ASTM D-1238. Melt index ($I_{10}$) is measured at 190° C. under a load of 10 kg, according to ASTM D-1238. Melt index ($I_{21}$) is measured at 190° C. under a load of 21.6 kg, according to ASTM D-1238. The melt flow rate (MFR) of an propylene-based polymer is measured in accordance with ASTM D-1238, condition 230° C./2.16 kg. The melt flow rate (MFR) of the TPO compounds was measured on the dried pellets according to ASTM D-1238, condition 230° C./2.16 kg.

Differential Scanning Calorimetry (DSC): Differential Scanning Calorimetry (DSC) was performed using a TA Instruments Discovery DSC, equipped with an RCS cooling unit and an autosampler. A nitrogen purge gas flow of 50 mL/min was used. The sample was pressed into a thin film, at 190° C., on a Carver Hydraulic press, at a pressure of 20,000 psi, and for a time of 4 minutes, followed by cooling at a temperature of 23° C., at a pressure of 20,000 psi for a time of 1 minute. About 3-10 mg of material was cut from the pressed film, weighed, placed in a light aluminum pan, and crimped shut. The thermal behavior of the samples was investigated using the following temperature profile: the sample was rapidly heated to 180° C., and held isothermally for 5 minutes. The sample was then cooled to −90° C., at 10° C./min, and held isothermally for 5 minutes. The sample was then heated to 150° C. at 10° C./min. The cooling and second heating curves were used for analysis. The glass transition temperature (Tg), melting temperature (Tm), and heat of enthalpy (ΔHm) were obtained from the second heat data. The crystallization temperature (Tc) was obtained from the first cool data. The Tg was determined using the half-height method. The Tm and Tc were determined as the peak of the melting endotherm and crystallization exotherm, respectively. The percent crystallinity is calculated by dividing the heat of fusion (Hf), determined from the second heat curve, by a theoretical heat of fusion of 292 J/g for PE (165 J/g, for PP), and multiplying this quantity by 100 (for example, % cryst.=(Hf/292 J/g)×100 (for PE)).

Dynamic Mechanical Spectroscopy (DMS) Rheology: The rheology of the inventive and comparative copolymers was measured on an Advanced Rheometric Expansion System (ARES), equipped with "25 mm" stainless steel parallel plates. Constant temperature dynamic frequency sweeps, in the frequency range of 0.1 to 100 rad/s, were performed under nitrogen purge at 190° C. Samples approximately "25.4 mm in diameter" and "3.2 mm thick" were compression molded on a Carver hydraulic hot press at a temperature of 190° C., at a pressure of 20,000 psi, for a time of four minutes, followed by cooling at a temperature of 23° C., at a pressure of 20,000 psi, for a time of one minute. The sample was placed on the lower plate, and allowed to melt for five minutes. The plates were then closed to a gap of 2.0 mm, and the sample trimmed to "25 mm in diameter." The sample was allowed to equilibrate at 190° C. for five minutes, before starting the test. The complex viscosity was measured at constant strain amplitude of 10%. Viscosity at 0.1 rad/s (V0.1) and at 100 rad/s (V100) are reported, along with the ratio (V0.1/V100) of the two viscosity values.

Gel Permeation Chromatography (GPC): A high temperature Gel Permeation Chromatography system (GPC IR) consisting of an Infra-red concentration detector (IR-5) from PolymerChar Inc (Valencia, Spain) was used for Molecular Weight (MW) and Molecular Weight Distribution (MWD) determination. The carrier solvent was 1,2,4-trichlorobenzene (TCB). The auto-sampler compartment was operated at 160° C., and the column compartment was operated at 150° C. The columns used were four Polymer Laboratories Mixed A LS, 20 micron columns. The chromatographic solvent (TCB) and the sample preparation solvent were from the same solvent source, with 250 ppm of butylated hydroxytoluene (BHT), and nitrogen sparged. The samples were prepared at a concentration of '2 mg/mL in TCB." Polyethylene samples were gently shaken at 160° C. for two hours. The injection volume was 200 µL, and the flow rate was 1.0 mL/minute.

Calibration of the GPC column set was performed with 21 narrow molecular weight distribution polystyrene standards. The molecular weights of the standards ranged from 580 to 8,400,000 g/mol, and were arranged in six "cocktail" mixtures, with at least a decade of separation between individual molecular weights.

The polystyrene standard peak molecular weights were converted to polyethylene molecular weights using the following equation (as described in Williams and Ward, J. Polym. Sci., Polym. Let., 6, 621 (1968)):

$$M_{polyethylene} = A(M_{polystyrene})^B \quad (1),$$

here B has a value of 1.0, and the experimentally determined value of A is around 0.41. A third order polynomial was used to fit the respective polyethylene-equivalent calibration points, obtained from equation (1), to their observed elution volumes of polystyrene standards. Number, weight, and z-average molecular weights were calculated according to the following equations:

$$\overline{Mn} = \frac{\sum_i Wf_i}{\sum_i (Wf_i/M_i)} \quad (2)$$

$$\overline{Mw} = \frac{\sum_i (Wf_i * M_i)}{\sum_i Wf_i} \quad (3)$$

$$\overline{Mz} = \frac{\sum_i (Wf_i * M_i^2)}{\sum_i (Wf_i * M_i)}, \quad (4)$$

where, $Wf_i$ is the weight fraction of the i-th component and $M_i$ is the molecular weight of the i-th component. The MWD was expressed as the ratio of the weight average molecular weight (Mw) to the number average molecular weight (Mn).

The accurate A value was determined by adjusting A value in equation (1), until Mw calculated using equation (3), and the corresponding retention volume polynomial, agreed with the known Mw value of 120,000 g/mol of a standard linear polyethylene homopolymer reference.

Particle Size Distribution (D50, D10, D90)

The particle size distribution can be measured using a Beckman Coulter LS 13 320 Laser Diffraction Particle Size Analyzer, equipped with the universal liquid module. This instrument uses the principles of light scattering, where the angular pattern of light, scattered by the particles, is measured. This scattered light pattern is then fed to a deconvolution algorithm to obtain a size distribution. This equipment works on physics first principle, and therefore is not calibrated. The scattering pattern can be affected by the complex refractive index of particles, and by that of the surrounding medium, so for maximum accuracy, the complex index of refraction of the particles, and the suspending media, are taken into account by the model. The complex index of refraction consists of a real part and an imaginary part. The real part is characterized by the bending of light, as it propagates from one medium to another, and the imaginary, or complex part, represents the absorption coefficient of the material. The index of refraction used in the size distribution measurement was "1.46+0.05i" for calcium stearate, and "1.57+0.05" for talc. Guidelines for selection of index of refraction can be found in the LS 13 320 operation manual, provided by Beckman Coulter (Florida, USA).

The sample (particles) is suspended in isopropyl alcohol, and then sonicated for five minutes in a sonic bath (Fisher Scientific model FS-14), and then injected into the universal liquid module, which is operated at a pumping speed of 50. The volume median diameter (D50, typically in micron) is defined as the particle diameter, where half of the volume distribution resides above this point, and half resides below this point. The D10 is defined as the particle diameter where 10% of the volume distribution lies below this point (D10). The D90 is defined as the particle diameter, where 90% of the volume distribution lies below this point (D90). The mass distribution can be calculated by multiplying by the density of the particles.

Flowability Test: The standard test funnel consists of a steep angle glass funnel with a 1.25" diameter discharge. The funnel was loaded with 2,500 gm of pellets, and the discharge rate was measured, by accurately timing the discharge time using a stopwatch. The samples were cured at 37° C., to simulate warmest expected temperatures during transportation or storage. The curing was carried out for up to 12 weeks. The flow rate measurement was always carried out at a pellet temperature of 21° C. Before each measurement, the pellets were placed at room temperature, for 24 hours, before each flow measurement.

Blocking Force
Test Method—Unconfined Yield Strength

A sufficient amount of coated or uncoated pellets was loaded into a 2 inch diameter (ID) cylinder, with a height to diameter ratio of 2.5, such that the level of pellets was flush with the top of the cylinder (typically 100-120 grams pellets). The cylinder was made up of two halves held together, in the vertical dimension, by a hose clamp. The pellets were subjected to a consolidation stress of 195 lb/ft$^2$ at 37° C. (static oven, ambient atmosphere). The pellets remain under this consolidated stress for 6 weeks. To measure the unconfined yield strength (UYS) at 21° C., the cylinder was then removed from the oven; the consolidation load was removed, and the pellets (in the cylinder) allowed to cool overnight at ambient temperature (21° C.) and atmosphere, to obtain a final sample of consolidated pellets. To measure the unconfined yield strength (UYS) at 0° C., the cylinder was then removed from the oven; the consolidation load was removed, and the pellets (in the cylinder) allowed to cool overnight in an environmental chamber, set at 0° C., ambient atmosphere, to obtain a final sample of consolidated pellets. The cylinder was placed on the platform of an INSTRON test machine. The two halves of the split cylinder were separated, after removing the hose clamp. If the pellets in the consolidated sample were totally free-flowing, the pellets did not hold the form of a cylinder, and will simply collect into a pile. If the consolidated mass of pellets does hold the form of a cylinder, an INSTRON machine was used to measure the maximum force required to crush the cylinder. The consolidated pellets were crushed using an INSTRON 5543 frame, to measure the maximum force required to break the "cylinder form" of the consolidated pellets. The consolidated pellets were positioned in the INSTRON in the vertical direction—longer dimension is the vertical direction. A constant strain rate of 2 mm/min (room temp.) was used for this test. To ensure data consistency, each composition (coated pellets) was measured twice, and the average reported.

The unconfined yield strength (UYS) was calculated as follows:

$$\text{UYS (lb/ft}^2\text{)} = \text{Peak force/cross-section area of cylinder.}$$

The UYS is an indication of blocking force (the greater the unconfined yield strength, the greater the blocking force). A zero value corresponds to free-flowing pellets.

Flexural Modulus: Flexural modulus (1% secant modulus) was measured according to ASTM D790, using injection molded, ASTM D638, Type 1 tensile bars (see experimental section below). A test speed of 0.05 in/min was used. Five specimens were tested for each sample, and the average 1% secant modulus was reported.

Izod Impact Strength: Notched Izod testing was conducted according to ASTM D256 using injection molded, ASTM D638, Type 1 tensile bars (see experimental section below). Testing was conducted at temperatures of 23° C., 0° C., and −40° C. Five specimens were tested for each sample, at each temperature, and the average impact strength for each sample at each temperature was reported.

Dart Impact Testing: Multi-axial dart impact testing was conducted on an INSTRON CEAST 9350 Drop Tower Impact System (Dynatup), equipped with an environmental chamber, and spring assisted, according to ASTM D3763. Four-inch diameter, "0.125-inch thick" injection molded discs were tested (see experimental section below. The discs were conditioned at the test temperature, for at least four hours, prior to testing. Specimens were removed from the freezer, and placed in an environmental chamber at the specified test temperature. A test speed of 6.7 m/s was used, with a total test mass of 29.131 kg, and "12.7 mm diameter" tup. Five specimens were tested for each sample, at each temperature. Samples were tested at −10° C., −20° C., and −30° C. The tested specimens were each characterized as ductile (no cracking or missing material from the tested part); cracked (cracking of the tested part observed, but no missing material for the tested part); or brittle (material broken off of the tested part or the part was broken into multiple separate pieces). Then the percent ductility was calculated according to the following Equation A:

$$\% \text{ Ductility} = (Nd*1 + Nc*0.5)/(Nd + Nc + Nb)*100 \qquad \text{(Eqn. A),}$$

where Nd=number of ductile specimens; Nc=number of cracked specimens; and Nb=number of brittle specimens.

The following examples illustrate the present invention, but are not intended to limit the scope of the invention.

EXAMPLES

A) Materials

ENGAGE 8842 (I2=1.0 g/10 min; density=0.857 g/cc), available from The Dow Chemical Company.

ENGAGE 8100 (I2=1.0 g/10 min; density=0.870 g/cc), available from The Dow Chemical Company.

ENGAGE 8200 (I2=5.0 g/10 min; density=0 0.870 g/cc), available from The Dow Chemical Company.

ENGAGE 8137 (I2=11.8 g/10 min; density=0.865 g/cc), available from The Dow Chemical Company.

Inorganic Powder for Coating: Talc: TALCRON MP 10-52 available from Specialty Minerals.

Organic Powder for Coating: Calcium Stearate (CaSt): SYNPRO CaSt 500B, available from Valerus.

Binder for Coating: Polydimethylsiloxane (XIAMETER PMX-200 Silicone Fluid—350 cSt at 25° C.), available from Dow Corning.

Polypropylene (PP) for each TPO formulation: ADSTIF HA801U (MFR=65 g/10 min; density=0.898 g/cc) is a nucleated polypropylene homopolymer available from LyondellBasell Industries.

Talc for TPO Compound: JETFIL 700C talc available from Imerys.

Antioxidant for TPO Compound: IRGANOX B 225 antioxidant powder available from BASF.

B) Polymerizations (Copolymers 1 and 2)

The inventive copolymers were prepared using a single loop reactor operated at steady state conditions. The catalysts and cocatalysts were as follows: catalyst was zirconium, [2,2'''-[1,3-propanediylbis(oxy-κO)]bis[3'',5,5''-tris(1,1-dimethylethyl)-5'-methyl[1,1':3',1''-terphenyl]-2'-olato-κO]]dimethyl-, (OC-6-33)- supplied by Boulder Scientific; cocatalyst-1 was a mixture of methyldi(C14-18 alkyl)ammonium salts of tetrakis(pentafluorophenyl)-borate, prepared by reaction of a long chain trialkylamine (ARMEEN M2HT, available from Akzo-Nobel, Inc.), HCl and Li[B(C6F5)4], substantially as disclosed in U.S. Pat. No. 5,919,983, Ex. 2 (no further purification performed) supplied by Boulder Scientific; and cocatalyst-2 was modified methylalumoxane (MMAO) Type 3A (no further purification performed) supplied by Akzo Nobel.

All materials (ethylene, 1-octene) and the process solvent (a narrow boiling range, high-Purity, isoparaffinic solvent, ISOPAR E, commercially available from Exxon Mobil Corporation), were purified with molecular sieves, before introduction into the reaction environment. Hydrogen was supplied in pressurized cylinders, as a high purity grade, and was not further purified. The reactor monomer feed (ethylene) stream was pressurized to above reaction pressure at 525 psig. The solvent and comonomer (1-octene) feed was pressurized to above reaction pressure at 525 psig. The individual catalyst components were diluted to specified component concentrations with purified solvent (ISOPAR E), and pressured to above reaction pressure at 525 psig.

All reaction feed flows were measured with mass flow meters, and independently controlled. The continuous solution polymerization reactor was a controlled loop. The reactor had independent control of all fresh solvent, monomer, comonomer, hydrogen, and catalyst component feeds. The combined solvent, monomer, comonomer and hydrogen feed to the reactor was temperature controlled from 5° C. to 50° C., and typically 30° C., by passing the feed stream through a heat exchanger. The fresh comonomer feed to the polymerization reactor was fed in, with the solvent feed.

The primary catalyst component feed was controlled, to maintain the reactor monomer concentration at a specified target. The two cocatalyst components were fed, based on specified molar ratios to the primary catalyst component. Immediately following each fresh injection location (either feed or catalyst), the feed streams were mixed with the circulating polymerization reactor contents. The contents of each reactor were continuously circulated through heat exchangers, to maintain isothermal reaction environment at the specified temperature. The effluent from the first polymerization reactor (containing solvent, monomer, comonomer, hydrogen, catalyst components, and molten polymer) exited the reactor loop, and was then contacted with water, to stop the reaction. In addition, various additives, such as antioxidants, can be added at this point. The stream then entered a two stage separation and devolatization system, where the polymer was removed from the solvent, hydrogen, and unreacted monomer and comonomer. The solvent (plus dissolved components) was recycled. The recycled stream was purified, before entering the reactor again. The separated and devolatilized polymer melt was pumped through a die, and pelletized. Pellets were roughly spherical in shape and approximately 3 to 6 mm in diameter.

Process conditions to produce the inventive copolymer are provided in Table 1. Properties of the inventive copolymers (Exs. 1 and 2) and comparative copolymers (Exs. A-D) are listed in Table 2.

TABLE 1

Polymerization Conditions for Inventive EO Copolymers

| Name | 1 | 2 |
|---|---|---|
| Catalyst Metal Conc., ppm metal | 7.4 | 7.4 |
| Catalyst solution flow, lb/hr | 1.10 | 1.03 |
| Cocatalyst-1 conc., ppm cocat | 372 | 372 |
| Cocatalyst-1 solution flow, lb/hr | 1.14 | 1.09 |
| Cocatalyst-2 conc., ppm Al | 61 | 61 |
| Cocatalyst-2 solution flow, lb/hr | 1.58 | 1.55 |
| Reactor Temperature, ° C. | 169 | 169 |
| Solvent Flow, lb/hr | 497 | 498 |
| Ethylene Flow, lb/hr | 118 | 119 |
| Octene Flow, lb/hr | 305 | 293 |
| Hydrogen Flow, sccm | 1446 | 2006 |
| Ethylene Conversion, % | 86 | 87 |
| Polymer Concentration, % | 36 | 33 |
| Production Rate, lb/hr | 222 | 206 |

TABLE 2

Properties of Inventive and Comparative Ethylene/Octene Copolymers (EOs)

| | Ex. | | | | | |
|---|---|---|---|---|---|---|
| | A ENGAGE 8842 | B ENGAGE 8100 | C ENGAGE 8200 | 1 | D ENGAGE 8137 | 2 |
| Density, g/cc | 0.857 | 0.870 | 0.870 | 0.859 | 0.865 | 0.859 |
| I2 (190° C.), g/10 min | 1.0 | 1.0 | 5.0 | 4.6 | 11.8 | 13.1 |
| I10/I2 | 8.0 | 7.7 | 7.4 | 7.5 | 7.1 | 7.1 |
| Mn, kg/mol | 55,050 | 48,480 | 33,290 | 40,412 | 29,980 | 32,975 |

TABLE 2-continued

Properties of Inventive and Comparative Ethylene/Octene Copolymers (EOs)

| | Ex. | | | | | |
|---|---|---|---|---|---|---|
| | A ENGAGE 8842 | B ENGAGE 8100 | C ENGAGE 8200 | 1 | D ENGAGE 8137 | 2 |
| Mw, kg/mol | 121,310 | 108,630 | 71,820 | 106,774 | 60,760 | 64,870 |
| Mw/Mn | 2.20 | 2.24 | 2.16 | 2.64 | 2.03 | 1.97 |
| Tc, °C. | 23 | 43 | 46 | 26 | 40 | 26 |
| Tg, °C. | −58 | −52 | −52 | −61 | −53 | −61 |
| Tm, °C. | 39 | 61 | 64 | 45 | 57 | 46 |
| ΔHm, J/g | 43 | 50 | 89 | 44 | 48 | 43 |
| V0.1, Pa·s (190° C.) | 8,679 | 7,936 | 1,511 | 1,907 | 692 | 638 |
| V100, Pa·s (190° C.) | 1,478 | 1,546 | 683 | 730 | 422 | 404 |
| V0.1/V100 | 5.9 | 5.1 | 2.2 | 2.6 | 1.6 | 1.6 |

C) Powder Coating and Application of Powder to Polymer Pellets

Two powders (80 wt % talc and 20 wt % CaSt) were dry blended at room temperature, in a container, with a hand-held, high speed mixer with a turbine impeller, for at least 15 minutes, to form a homogeneous mixture (powder composition). The mixing action was both convective and high shear. The batch size was 100 grams. Pellets (2500 grams, copolymer 1 or copolymer 2) were first coated with the above polydimethylsiloxane oil (binder) by spraying, while tumbling in a batch drum mixer (25½" diameter and 6¼" long), at room temperature (RPM=8). The sprayed pellets were tumbled, until the pellets were substantially coated with the binder. The oil coated pellets were then transferred to a large bag (5 gallon), and the powder composition was added in increments of "25 wt % of powder composition," based on total weight of the target coating level of the powder composition. The contents of the bags were mixed for one minute between each addition. The mixing action in the bag was mechanistically similar to a paddle mixer with convective and shear mixing. The binder and powder composition were applied to binder-coated pellets. The amount of the polydimethylsiloxane amount was "250 ppm," based on the weight of the uncoated polymer particles; and the amount of the powder composition was 6,000 ppm based on the weight of the uncoated polymer particles. The coated polymer particles were tested for flowability and blocking.

Flowability and blocking of the coated polymer particles are shown in Table 3. Flowability of greater than 150 g/s is regarded as sufficient flow of pellets, for example, for proper feeding of pellets into a twin screw extruder.

TABLE 3

Flowability and Blocking of Coated Polymer Particles

| Type | Comp. | Inv. | Comp. | Inv. |
|---|---|---|---|---|
| EO Copolymer | A | 1 | D | 2 |
| EO I2, dg/min | 1.0 | 4.6 | 11.8 | 13.1 |
| EO Density, g/cc | 0.857 | 0.859 | 0.865 | 0.859 |
| EO Coating | 3500 ppm Talc | 250 ppm binder + 6000 ppm CaSt2/Talc (20/80 wt %) | 3500 ppm Talc | 250 ppm binder + 6000 ppm CaSt2/Talc (20/80 wt %) |
| Flowability after curing 12 weeks at 37° C., g/s | — | 233 | — | 224 |
| Unconfined yield strength at 0° C., after curing at 37° C. for 6 weeks (lb/ft$^2$) | — | 580 | — | 595 |
| Unconfined yield strength at 21° C., after curing at 37° C. for 6 weeks (lb/ft$^2$) | — | 215 | — | 360 |

D) TPO

The above coated particles were used to form TPO formulations. TPO formulations are listed in Table 4. The same PP, talc, and antioxidant were used for all of the TPO formulations. The TPO formulations were prepared and tested using the methods described below.

separate powder feeder. The compound was extruded as a strand, which was cooled in a water bath, passed under an air knife, and pelletized using a strand cutter. All compounds were dried by purging with a nitrogen stream overnight. The process conditions used for all of the compounds is provided in Table 5.

TABLE 4

TPO Formulations

| | Type | | | | | |
|---|---|---|---|---|---|---|
| | Comp. | Comp. | Comp. | Inv. Ex. | Comp. | Inv. |
| | TPO A | TPO B | TPO C | TPO 1 | TPO D | TPO 2 |
| EO Copolymer | A | B | C | 1 | D | 2 |
| EO I2, dg/min | 1.0 | 1.1 | 5.0 | 4.6 | 11.8 | 13.1 |
| EO Density, g/cc | 0.857 | 0.870 | 0.870 | 0.859 | 0.865 | 0.859 |
| EO Coating[1] | 3500 ppm Talc | None | None | 250 ppm binder + 6000 ppm CaSt2/ Talc (20/80 wt %) | 3500 ppm Talc | 250 ppm binder + 6000 ppm CaSt2/ Talc (20/80 wt %) |
| Coated Polymer Particles wt %/ Elastomer wt %[2] | 29.3/29.20 | | | 29.3/29.12 | 29.3/29.20 | 29.3/29.12 |
| EO wt %[3] | | 29.3 | 29.3 | | | |
| PP wt %[3] | 60.5 | 60.5 | 60.5 | 60.5 | 60.5 | 60.5 |
| Talc wt %[3] | 10.0 | 10.0 | 10.0 | 10.0 | 10.0 | 10.0 |
| Antioxidant wt %[3] | 0.2 | 0.2 | 0.2 | 0.2 | 0.2 | 0.2 |
| MFR (2.16 kg, 230° C.), g/10 min | 25 | 23 | 42 | 44 | 51 | 50 |

| | Type | | | | | |
|---|---|---|---|---|---|---|
| | Comp. | Comp. | Comp. | Inv. Ex. | Comp. | Inv. |
| | TPO E | TPO F | TPO G | TPO 3 | TPO H | TPO 4 |
| Elastomer | A | B | C | 1 | D | 2 |
| Elastomer I2, dg/min | 1.0 | 1.1 | 5.0 | 4.6 | 11.8 | 13.1 |
| Elastomer Density, g/cc | 0.857 | 0.870 | 0.870 | 0.859 | 0.865 | 0.859 |
| Elastomer Coating[1] | 3500 ppm Talc | None | None | 250 ppm binder + 6000 ppm CaSt2/ Talc (20/80 wt %) | 3500 ppm Talc | 250 ppm binder + 6000 ppm CaSt2/ Talc (20/80 wt %) |
| Coated Polymer Particles wt %/ Elastomer wt %[2] | 33.8/33.68 | | | 33.8/33.59 | 33.8/33.68 | 33.8/33.59 |
| Elastomer wt %[3] | | 33.8 | 33.8 | | | |
| PP wt %[3] | 56.0 | 56.0 | 56.0 | 56.0 | 56.0 | 56.0 |
| Talc wt %[3] | 10.0 | 10.0 | 10.0 | 10.0 | 10.0 | 10.0 |
| Antioxidant wt %[3] | 0.2 | 0.2 | 0.2 | 0.2 | 0.2 | 0.2 |
| MFR (2.16 kg, 230° C.), g/10 min | 21 | 20 | 34 | 35 | 48 | 50 |

[1]The ppm amount based on weight of uncoated polymer particles.
[2]Each wt % based on weight of TPO formulation.
[3]The wt % based on weight of TPO formulation.

Compounding:

TPO formulations were prepared on a Coperion ZSK-25 mm, twin screw extruder, equipped with a two-hole die, water bath, and strand cutter. All components were added via the main feed throat. The polymer components were dry-blended, along with the IRGANOX B225 antioxidant, and fed via a loss-in-weight feeder. A few drops of oil were added to the pellets to help adhere the antioxidant powder to the pellets. The talc was fed to the main feed throat via a

TABLE 5

| Compounding Conditions | |
|---|---|
| Zone 1° C. | 130 |
| Zone 2° C. | 180 |
| Zone 3° C. | 200 |
| Zone 4° C. | 200 |

TABLE 5-continued

| Compounding Conditions | |
|---|---|
| Zone 5° C. | 200 |
| Zone 6° C. | 200 |
| Zone 7° C. | 200 |
| Zone 8° C. | 200 |
| Extruder RPM | 300 |
| Rate, lb/hr | 30 |

Injection Molding: The TPO compounds, in pellet form, were converted to test samples, for mechanical testing, by injection molding. Injection molded parts were made on a "Krauss-Maffei KM 110-390/390 CL" injection molding machine, equipped with an Axxicon mold base. ASTM D638 Type I tensile bars, and 4" diameter, 0.125" thick discs were made. The same molding conditions were used for all of the inventive and comparative examples listed in Table 4, using the injection molding conditions listed in Table 6. The ASMT D638 Type I tensile bars were used to measure flexural modulus and notched Izod impact strength. The injection molded discs were used to measure multi-axial dart impact. The mechanical properties of the inventive and comparative TPO compounds are provided in Table 7.

TABLE 6

| Injection Molding Conditions | | | |
|---|---|---|---|
| Condition | Units | 4" Disc | ASTM D638 Type 1 |
| Feed Throat Temperature | ° C. | 30 | 30 |
| Zone 1 Temperature | ° C. | 226 | 226 |
| Zone 2 Temperature | ° C. | 226 | 226 |
| Zone 3 Temperature | ° C. | 226 | 226 |
| Zone 4 Temperature | ° C. | 226 | 226 |
| Zone 5 Temperature | ° C. | 226 | 226 |
| Nozzle Temperature | ° C. | 226 | 226 |
| Mold Temperature | ° F. | 90 | 90 |
| RPM | rpm | 90 | 90 |
| Backpressure | bar | 50 | 50 |
| Dosage Delay | sec | 0 | 0 |
| Dosage | mm | 45 | 40 |
| Suckback | mm | 5 | 5 |
| Injection Speed | mm/s | 40 | 40 |
| Injection Pressure | bar | 2000 | 2000 |
| Switch Over Position | mm/s | 15 | 10 |
| Hold Pressure | bar | 350 | 425 |
| Hold Time | sec | 21 | 21 |
| Cool Time | sec | 21 | 21 |

TABLE 7

TPO Mechanical Properties and MFR

| | Type | | | | | |
|---|---|---|---|---|---|---|
| | Comp. | Comp. | Comp. | Inv. Ex. | Comp. | Inv. |
| | TPO A | TPO B | TPO C | TPO 1 | TPO D | TPO 2 |
| Flexural Modulus, kpsi | 209 | 222 | 218 | 199 | 205 | 182 |
| Izod strength at 23° C., kJ/m2 | 45.9 | 9.5 | 8.0 | 32.7 | 9.8 | 26.9 |
| Izod strength at 0° C., kJ/m2 | 12.6 | 6.2 | 5.5 | 13.9 | 6.5 | 9.0 |
| Izod strength at −40° C., kJ/m2 | 5.4 | 5.2 | 3.9 | 5.2 | 4.1 | 4.5 |
| Dart at −10° C., % Ductility | 90 | 40 | 20 | 100 | 30 | 100 |
| Dart at −20° C., % Ductility | 90 | 0 | 0 | 100 | 0 | 40 |
| Dart at −30° C., % Ductility | 60 | 0 | 0 | 30 | 0 | 0 |
| MFR, 2.16 kg, 230° C., dg/min | 25 | 23 | 42 | 44 | 51 | 50 |

| | Type | | | | | |
|---|---|---|---|---|---|---|
| | Comp. | Comp. | Comp. | Inv. Ex. | Comp. | Inv. |
| | TPO E | TPO F | TPO G | TPO 3 | TPO H | TPO 4 |
| Flexural Modulus, kpsi | 181 | 185 | 183 | 182 | 180 | 165 |
| Izod strength at 23° C., kJ/m2 | 61.1 | 46.9 | 26.2 | 41.2 | 22.3 | 29.2 |
| Izod strength at 0° C., kJ/m2 | 52.8 | 31.6 | 7.4 | 32.1 | 10.9 | 19.1 |
| Izod strength at −40° C., kJ/m2 | 9.9 | 6.5 | 5.1 | 7.7 | 5.1 | 5.6 |
| Dart at −10° C., % Ductility | 100 | 100 | 100 | 100 | 90 | 100 |
| Dart at −20° C., % Ductility | 100 | 100 | 100 | 100 | 20 | 100 |
| Dart at −30° C., % Ductility | 100 | 10 | 0 | 80 | 0 | 90 |
| MFR, 2.16 kg, 230° C., dg/min | 21 | 20 | 34 | 35 | 48 | 50 |

The powder composition will not affect these mechanical properties. The low binder level will not affect these mechanical properties.

E) Summary of Results

Inventive TPO 1 and TPO 3 comprise an ethylene-octene copolymer (Inventive Copolymer 1) of lower density and similar melt index to the elastomer (Comparative Copolymer C) used in TPO C and TPO G. It was discovered that TPO 1 and TPO 3 had slightly lower flexural modulus and similar MFR as TPO C and TPO G, respectively, but were advantaged in impact toughness, with higher Izod impact strength and higher dart ductility over the temperature ranges tested. In addition, despite the low density and high MI of the Inventive Copolymer 1, used in TPO 1 and TPO 3, it was discovered that pellets of Inventive Copolymer 1 were free-flowing pellets, which allowed facile production of the TPO compounds on typical twin screw extrusion equipment. Similarly, inventive TPO 2 and TPO 4 comprise an ethylene-octene copolymer (Inventive Copolymer 2) of lower density and similar melt index to the elastomer (Comparative Copolymer D) used in TPO D and TPO H. It was discovered that TPO 2 and TPO 4 had lower flexural modulus and similar MFR as TPO D and TPO H, respectively, but were advantaged in impact toughness, with higher Izod impact strength and higher dart ductility over the temperature ranges tested. In addition, despite the low density and high MI of the Inventive Copolymer 2 used in TPO 2 and TPO 4, the pellets of Inventive Copolymer 2 were free-flowing pellets, which allowed facile production of the TPO compounds on typical twin screw extrusion equipment.

Inventive TPO 1 and TPO 3 comprise an ethylene-octene copolymer (Inventive Copolymer 1) of higher melt index and similar density to the elastomer (Comparative Example A) used in TPO A and TPO E. It was discovered that TPO 1 and TPO 3 have slightly lower Izod impact strength and similar flexural modulus, as compared to TPO A and TPO E, respectively, but have similar dart ductility over the −10° C. to −30° C. temperature range, and much higher MFR. Higher MFR of the TPO compound is advantageous for filling thinner and larger injection molded parts. Also, despite the higher MI of Inventive Copolymer 1, as compared to Comparative Example A, the pellets of Inventive Copolymer 1 were free-flowing pellets, which allowed facile production of the TPO compounds on typical twin screw extrusion equipment. It has been discovered that the inventive TPO formulations surprisingly provide excellent flow, stiffness, and toughness.

What is claimed is:

1. A composition comprising the following:
    A) coated polymer particles, and wherein the polymer particles of the coated polymer particles are formed from a first composition comprising an ethylene-based polymer that comprises the following properties: a density from 0.854 to 0.860 g/cc, and a melt index (I2) from 4.0 to 15.0 g/10 min; and
wherein the polymer particles comprise a coating on at least a portion of the total surface of the polymer particles, and
    wherein the coating is formed from a powder composition comprising at least one inorganic powder and at least one organic powder selected from a metal stearate and/or a polymer powder, and wherein the weight ratio of the total amount of the inorganic powder to the total amount of the organic powder is from 3.0 to 50.0;
    B) a propylene-based polymer,
    and wherein the composition comprises ≥50 wt % of component B and ≤50 wt % of component A, wherein each wt % is based on the weight of the composition.

2. The composition of claim 1, wherein the propylene-based polymer of component B has a MFR from 20 to 120 g/10 min, and a density from 0.880 to 0.920 g/cc.

3. The composition of claim 1, wherein the composition has a MFR ≥30 g/10 min.

4. The composition of claim 1, wherein the composition has a MFR from 30 to 60 g/10 min.

5. The composition of claim 1, wherein, for component A, the first composition comprises ≥95 wt % of the ethylene-based polymer, based on the weight of the first composition.

6. The composition of claim 1, wherein, for component A, the ethylene-based polymer is an ethylene/alpha-olefin interpolymer.

7. The composition of claim 1, wherein, for component A, the organic powder is a metal stearate.

8. The composition of claim 1, wherein, for component A, the inorganic powder is selected from the group consisting of the following: talc, mica, calcium carbonate, finely divided silica, fumed silica, quartz, and combinations thereof.

9. The composition of claim 1, wherein, for component A, the coated polymer particles further comprise a binder.

10. The composition of claim 9, wherein the binder is a silicone fluid.

11. An article comprising at least one component formed from the composition of claim 1.

* * * * *